A. H. WELLS.
Devices for Shaving the Joints of Soldered Tubing.
No. 152,585. Patented June 30, 1874.
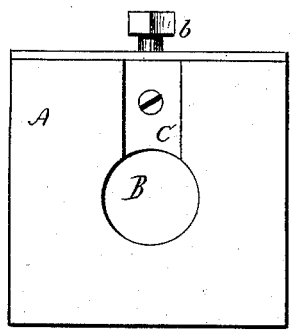
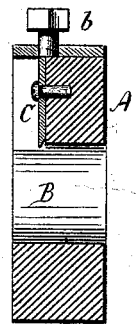

UNITED STATES PATENT OFFICE.

AMBROSE H. WELLS, OF WATERBURY, CONNECTICUT, ASSIGNOR TO HIMSELF AND BROWN & BROTHERS, OF SAME PLACE.

IMPROVEMENT IN DEVICES FOR SHAVING THE JOINTS OF SOLDERED TUBING.

Specification forming part of Letters Patent No. 152,585, dated June 30, 1874; application filed May 25, 1874.

*To all whom it may concern:*

Be it known that I, AMBROSE H. WELLS, of Waterbury, in the county of New Haven and State of Connecticut, have invented a new Improvement in the Manufacture of Sheet-Metal Tubing; and I do hereby declare the following, when taken in connection with the accompanying drawings and the letters of reference marked thereon, to be a full, clear, and exact description of the same, and which said drawings constitute part of this specification, and represent, in—

Figure 1, a front view of the die; Fig. 2, a vertical section; and in Fig. 3, the partly finished tube.

This invention relates to an improvement in the manufacture of that class of sheet-metal tubing in which the meeting edges are soldered or brazed, such as are used in the manufacture of gas-fixtures to cover the iron pipe, and for similar purposes.

In the manufacture of this tubing the edges are brought together, and the solder run on over the joint, leaving a ridge or rib of solder on the surface, as at $a$, Fig. 3. The usual method of finishing the surface of the tube after soldering or brazing has been to file off this ridge of surplus solder by hand. This is a laborious process, and particularly so if any degree of perfection of finish is attained.

The object of this invention is to avoid the hand-filing and to produce more perfect work; and it consists in drawing the tube through a die having a cutting-edge to pass over the soldered or brazed surface, and dress off the surplus solder.

A represents the block or die, the aperture B of which corresponds to the exterior surface of the finished tube. At a convenient point a cutter, C, is set, the edge of which corresponds to the part of the aperture B in which it sits. Above the cutter is a set-screw, $b$, bearing upon the top or outer end of the cutter to hold it down to its work, and to adjust the cutter when occasion requires.

The tube after soldering unavoidably has a ridge of solder over the joint, as at $a$, Fig. 2. After soldering the tube is passed through the die, the ridge $a$ in line with the cutter C, which dresses off the surplus metal, leaving the joint free and smooth, as at $b$, Fig. 2, and the surface as smooth and finished as the remainder of the surface of the tube, and the finishing performed with much greater rapidity than by the usual process, and without the necessity of skilled labor.

I claim as my invention—

The herein-described die for dressing the joint of soldered or brazed sheet-metal tubing, the same consisting of the block A, with the aperture B, and the cutter C, the edge of which forms a segment of said aperture, substantially as specified.

AMBROSE H. WELLS.

Witnesses:
   A. J. TIBBITS,
   J. H. SHUMWAY.